UNITED STATES PATENT OFFICE.

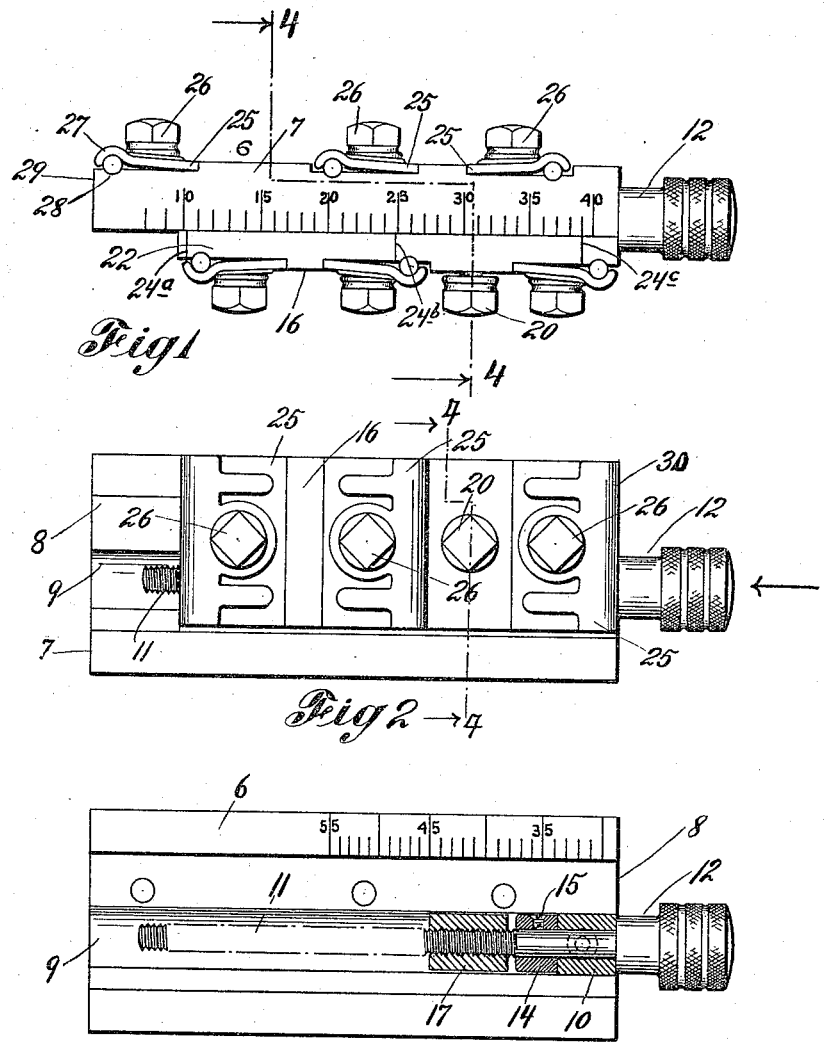

HERMAN E. S. CHAYES, OF NEW YORK, N. Y.

MEASURING INSTRUMENT.

1,184,322.  Specification of Letters Patent.  Patented May 23, 1916.

Application filed November 12, 1913. Serial No. 800,553.

*To all whom it may concern:*

Be it known that I, HERMAN E. S. CHAYES, a citizen of the United States of America, and resident of New York, in the county of New York and State of New York, whose post-office address is No. 576 Fifth avenue, New York, N. Y., have invented certain new and useful Improvements in Measuring Instruments, of which the following is a specification.

This invention relates to new and useful improvements in measuring instruments, particularly adapted for use in connection with certain dental operations.

An object of the invention is to provide an instrument with means for holding certain tools in adjustably spaced relation, and with means for fixing the parts in such adjusted relation.

Another object is to provide an instrument accomplishing the end just stated, in which the over-all dimensions are small, and in which wide ranges of adjustment are possible without increase in the over-all dimensions of the instrument.

Other objects and aims of the invention, more or less broad than those stated above, together with the advantages inherent, will be in part obvious and in part specifically referred to in the course of the following description of the elements, combinations, arrangements of parts, and applications of principles constituting the invention; and the scope of protection contemplated will appear from the claims.

In the accompanying drawing, which is to be taken as a part of this specification, and in which I have shown one of the various possible embodiments of this invention as at present preferred: Figure 1 is an elevation on an enlarged scale, of an instrument embodying my invention; Fig. 2 is a bottom plan view of the same; Fig. 3 is a bottom plan view of one of the members of the instrument, with certain parts in section; and Fig. 4 is a sectional view taken on the line 4—4 of Fig. 2, looking in the direction of the arrows.

Referring to the numerals on the drawing, there is shown at 6 one of the two principal parts of the instrument, comprising an oblong bar having a side surface indicated at 7, and provided with calibrations as shown in Fig. 1, and having also a bottom surface shown in Fig. 3 and provided with calibrations as shown in said Fig. 3. The member 6 is provided with a dove-tail slideway 8, and also with a trough 9 sunk below the level of the floor of this slideway 8. In one end of this trough 9 is secured a cylindrical bearing 10, through which passes a screw 11 having an enlarged thumb-piece 12. This screw is free to rotate within the bearing 10 and trough 9, but is held against longitudinal movement in one direction by means of a collar 14 that is fixed in place as by means of a set screw 15, the screw being restrained against longitudinal movement in the opposite direction by the thumb-piece 12. The complementary part of the instrument is indicated by the numeral 16 in Figs. 1, 2 and 4, and comprises in this instance an oblong bar provided with a longitudinal dove-tail portion corresponding to the dove-tail slideway in the member 6, so that the member 16 may slide longitudinally relatively to the member 6. This relative sliding movement is accomplished by rotation of the screw 11 because of the engagement of said screw with an internally threaded cylindrical member 17 fixed within trough 18 of the member 16 preferably integral with the latter and extending into trough 9 of the member 6, these troughs 9 and 18 completely inclosing the screw 11.

From the foregoing description it will be evident that upon manipulation of the screw 11, a relative sliding movement may be brought about between the members 6 and 16. The members 6 and 16 may be set in any relative position to which they may be adjusted as by means of a headed screw 20 that extends through the member 16 and bears upon the opposed surface of the member 6 through an interposed disk 21 of relatively soft metal or material which is set into the enlarged inner end of the opening through which said screw is threaded. As before stated, the face 7 of the member 6 is provided with calibrations as shown in Fig. 1, and the underface of this member 6, shown in Fig. 3, is also provided with calibrations as shown in said Fig. 3. These calibrations, in the present instance, represent a given unit of length, as, for instance, millimeters; and the complementary member 16 carries on its face 22, shown in Fig. 1, a plurality of index notches 24$^a$, 24$^b$ and 24$^c$, for accomplishing readings of the calibrations on the face 7. At one end of the member 6, and on the edge opposite the calibrated edge thereof, is a clamping member 25, including an adjusting screw 26. This clamping member 25 includes a socket portion 27 corresponding with a transverse recess 28 across the end of the member 6. In the recess formed by the sockets 27 and 28 it is intended to hold a post or shank of a tool such as is employed, for instance, in dental operations, and such post or shank can be extended all the way across the instrument and extend on both sides thereof if desired. The edge 29 of the member 6 is an index line for this socket or for the post or tool which may be secured therein. Similarly, I provide other clamping members 25 spaced apart longitudinally on the face 7 of the member 6, both of them controlled by screws 26, and being arranged and operating in the same manner as the one already described. The member 16 is likewise provided with a plurality of clamping members 25, controlled by screws 26, and forming, in connection with transverse depressions in the member 16, sockets for posts or tools similar to those which are adapted to be held within the corresponding portions of the member 6. In the form shown, there are three of these post or tool holding portions in the member 16, spaced apart longitudinally, and to each of these tool holding portions is appropriated one of the index notches 24. Furthermore, the perpendicular edge 30 is also intended to be used at times as an index in the reading of the calibrations on the underface of the member 6, shown in Fig. 3, as will hereinafter be described.

In use, supposing that a post was held by the clamping member at the extreme left-hand of the member 6 as shown in Fig. 1, and that another post was held by the clamping member at the left-hand end of the member 16, as shown in Fig. 1. If the screw 11 is manipulated so that the index notch appropriated to the clamping member at the left of the member 16, indicated as 24$^a$, alines with the edge 29 of the member 6, then it is known that the distance between the centers of the posts held by these two clamping members is say seven millimeters. If the screw 11 be manipulated so that the notch 24$^a$ travels to the right and to the first calibration shown in Fig. 1, then the distance from post to post will be, say, eight millimeters, and so on. If the measurement be of some distance greater than ten millimeters and less than twenty-five, then, leaving one of the posts or tools in the clamping portion at the left-hand end of member 6 (Fig. 1), the other post or tool is placed in the intermediate clamping portion of member 16 identified by the index notch 24$^b$. And if the measurement be of a distance between twenty-five and forty millimeters, then that one of the posts held by the clamping portion on the extreme left of member 6 is left in place, and the other post is placed within the clamping portion of member 16 identified by the index notch 24$^c$. Inasmuch as in making such measurement, we are in effect reading the length of the hypotenuse of a right angle triangle in terms of the base thereof, it follows that the spacing of the calibrations on the faces of the member 6 as shown in Figs. 1 and 3, must progressively change. In the present instance, the calibrations are closer together toward the right (Fig. 1) and closer together toward the left (Fig. 3). If it is desired to make a measurement of more than forty millimeters, one of the posts or other parts is placed in the clamping portion at the extreme right hand end of the member 6 (Fig. 1), and the other post is held in the clamping portion of member 16 identified by the index notch 24$^a$, and the edge 30 of the member 16 is used as an index for reading the calibrations upon the underface of the member 6 (Fig. 3).

It will be apparent that by this device on account of the plurality of clamping portions on each sliding member I am enabled to make measurements and adjustments within a considerable range, without necessitating any very great sliding movement between the two members 6 and 16; it is evident that for any given measurement the operator may select two of the clamping portions on the respective sliding members which will enable him to secure the measurement with the minimum of adjustment. Therefore the instrument may be made of small size so that it can be used in the mouth for dental work. The intermediate clamping portion on the member 6 may be used for the support of a supporting leg or the like when the instrument is used outside the mouth, as, for instance, on a model.

Inasmuch as many changes could be made in the above construction, and many apparently widely different embodiments of my invention could be made without departing from the scope thereof, it is intended that all matter contained in the above description or shown in the accompanying drawings shall be interpreted as illustrative and not in a limiting sense.

It is also to be understood that the language used in the following claims is intended to cover all the generic and specific features of the invention herein described and all statements of the scope of the invention which, as a matter of language, might be said to fall therebetween.

Having described my invention, what I claim as new and desire to secure by Letters Patent, is:

1. In an instrument of the kind described, two relatively sliding members, slow motion means for moving the members relatively to each other, each member having a spaced plurality of tool holding portions arranged in a straight line, the two lines being parallel but separated, and one of the members bearing a line of calibrations on its edge whereon the distance between a tool holding portion on one member and a tool holding portion on the other member may be read, the spacing of such calibrations being such as to allow for the varying angular relations between the tool holding portions as the two members are moved relatively to each other, the other of said members having an index notch or line on its edge adjacent each of its tool supporting portions, to be used in reading the calibrations on the opposed edge of the other member.

2. In an instrument of the kind described, two relatively sliding members having flat faces in a common plane, and having also flat faces which are in contact during the relative movements of the members, the faces of the two members that are in a common plane bearing calibrations and index portions respectively, the face of one of the members that is in contact with a face of the other member, as aforesaid, carrying calibrations, and the other member having an index portion for reading such last named calibrations, each member having a spaced plurality of tool-holding portions arranged in a straight line, the aforesaid calibrations being intended for reading distance between a tool-holding portion on one member and a tool-holding portion on the other member.

In witness whereof I have hereunto signed my name in the presence of two witnesses.

HERMAN E. S. CHAYES.

In presence of—
ALDA L. MILLER,
MARY H. LEWIS.

Copies of this patent may be obtained for five cents each, by addressing the "Commissioner of Patents, Washington, D. C."